(12) United States Patent
Wang et al.

(10) Patent No.: US 11,774,243 B2
(45) Date of Patent: Oct. 3, 2023

(54) ELECTRICALLY-DRIVEN GYROSCOPE HAVING HOUSING CAPABLE OF ALTERNATE ROTATION

(71) Applicant: Southeast University, Jiangsu (CN)

(72) Inventors: Jiyao Wang, Jiangsu (CN); Wei Xu, Jiangsu (CN); Ling Qin, Jiangsu (CN)

(73) Assignee: Southeast University, Jiangsu (CN)

( * ) Notice: Subject to any disclaimer, the term of this patent is extended or adjusted under 35 U.S.C. 154(b) by 0 days.

(21) Appl. No.: 17/723,633

(22) Filed: Apr. 19, 2022

(65) Prior Publication Data

US 2023/0152096 A1     May 18, 2023

(30) Foreign Application Priority Data

Nov. 15, 2021   (CN) .......................... 202111345700.0

(51) Int. Cl.
*G01C 19/06*     (2006.01)
(52) U.S. Cl.
CPC .................... *G01C 19/06* (2013.01)
(58) Field of Classification Search
CPC ....... G01C 19/065; G01C 19/08; G01C 19/06
See application file for complete search history.

(56) References Cited

U.S. PATENT DOCUMENTS 6,458,008 B1 * 10/2002 Hyneman ................ A63H 1/00
446/259

FOREIGN PATENT DOCUMENTS

| CN | 2515864 Y | 10/2002 |
|---|---|---|
| CN | 108455364 A | 8/2018 |

* cited by examiner

*Primary Examiner* — Paul M. West
*Assistant Examiner* — Mark A Shabman
(74) *Attorney, Agent, or Firm* — CASIMIR JONES, S.C.; Brian F. Bradley

(57) ABSTRACT

An electrically-driven gyroscope having a housing capable of alternate rotation and a control method thereof, which relate to the field of electrically-driven gyroscopes. The electrically-driven gyroscope includes a rotating housing, an internal rotator, a drive motor composed of an electrical stator part and a rotating part, a drive circuit, and a battery. The internal rotator is mechanically connected to the rotating part of the drive motor, and they can coaxially rotate. The electrical stator part of the motor, the drive circuit, and the battery are mutually electrically connected, and are all connected inside the rotating housing.

4 Claims, 3 Drawing Sheets

ELECTRICALLY-DRIVEN GYROSCOPE HAVING HOUSING CAPABLE OF ALTERNATE ROTATION

TECHNICAL FIELD

The present disclosure relates to the field of electrically-driven gyroscopes, and more particularly to an electrically-driven gyroscope having a housing capable of alternate rotation.

BACKGROUND

When rotating about the axis, the conventional gyro device can maintain upright rotation due to the generated gyro effect. However, the friction between the bottom of the gyroscope and its support plane results in consumption of the angular momentum of the gyroscope with the time, so that the gyroscope gradually decelerates and cannot sustain upright rotation for a long time. Although it is feasible to achieve long-time rotation of the gyroscope by methods such as applying electric power or electromagnetic force, the gyroscope itself is a force-receiving object, and it requires an external force-applying object. For example, a rotating electromagnetic force can be supplied to the gyroscope by use of an external base, and in this case, the base is the force-applying object; alternatively, an aerodynamic force can be generated by means of fan blades or air blowing ports mounted on the gyroscope, and in this case, the surrounding air is the force-applying object; or, the gyro housing can be divided into two parts, where the upper part makes free rotation, and the lower part together with its support plane serves as the force-applying object. However, such a gyroscope can only maintain continuous rotation of its upper part, but its lower part decelerates due to the friction with the support plane and cannot constantly rotate.

For a single-shell gyroscope that does not rely on external forces from a fixed base, a fixed frame, the aerodynamic force, or similar external force sources, the external friction always tends to slow down the gyroscope, and this law cannot be changed even though an electric motor is placed inside the gyroscope. The external friction causes a decrease in the overall angular momentum of the gyroscope and thus results in deceleration. Therefore, the single-shell gyroscope cannot sustain an upright posture while its housing constantly rotates unidirectionally.

SUMMARY

To overcome the shortcomings in the prior art, the present disclosure aims to provide an electrically-driven gyroscope having a housing capable of alternate rotation, which can solve the problem that the single-shell gyroscope decelerates and cannot sustain upright rotation for a long time due to the friction with the support plane, so that the single-shell gyroscope can achieve long-time rotation and an upright posture without relying on an external force.

The objective of the present disclosure can be achieved by using the following technical solution:

An electrically-driven gyroscope having a housing capable of alternate rotation is provided, which includes: a rotating housing (1), an internal rotator (2), a drive motor composed of an electrical stator part (3) and a rotating part (4), a drive circuit (5), and a battery (6), where the rotating housing (1) is controlled to make positive and negative alternate rotations at an average speed of zero; the internal rotator (2) is mechanically connected to the rotating part (4) of the drive motor, and they rotate with respect to the rotating housing (1) always in one direction; and the electrical stator part (3) of the motor; the drive circuit (5), and the battery (6) are mutually electrically connected, and are all connected inside the rotating housing (1).

Further, the electrical stator part (3) and the rotating part (4) of the drive motor are driven by itself; and the used drive motor is one of an inner rotor motor, an outer rotor motor, and an axial motor.

Further, the drive circuit (5) includes: a rotation speed sensor used for measuring a rotation speed of the rotating housing (1) with respect to an inertial reference system; a motor drive circuit used for performing bidirectional voltage, current and energy interaction with the motor; and a control module used for realizing the alternate rotation characteristic of the housing and the rotation characteristic of the internal rotator.

Further, a target trajectory which defines a rotation speed of alternate rotation of the housing is a trajectory with an average value of zero; and the trajectory is constantly equal to zero, or in the shape of a symmetric triangular wave, a symmetric square wave, or other symmetric or asymmetrical trajectories with an average value of zero.

Further, a target value of the rotation speed of the internal rotator (2) with respect to the rotating housing (1) is constantly positive or negative during one run when the gyroscope maintains an upright posture, and its absolute value is always greater than a boundary value, the boundary value is the minimum rotation speed which can keep the whole gyroscope stable and upright.

The present disclosure has the following beneficial effects:

The electrically-driven gyro device having a housing capable of alternate rotation disclosed in the present disclosure has an integral housing; and does not need to rely on an external force-applying object or the aerodynamic force by means of the disclosed design manner and control method, thus realizing autonomous continuous rotation and maintaining an upright alternate rotation posture until the battery is depleted.

BRIEF DESCRIPTION OF THE DRAWINGS

The present disclosure is further described below with reference to the accompanying drawings.

DETAILED DESCRIPTION OF THE EMBODIMENTS

Figure 1:
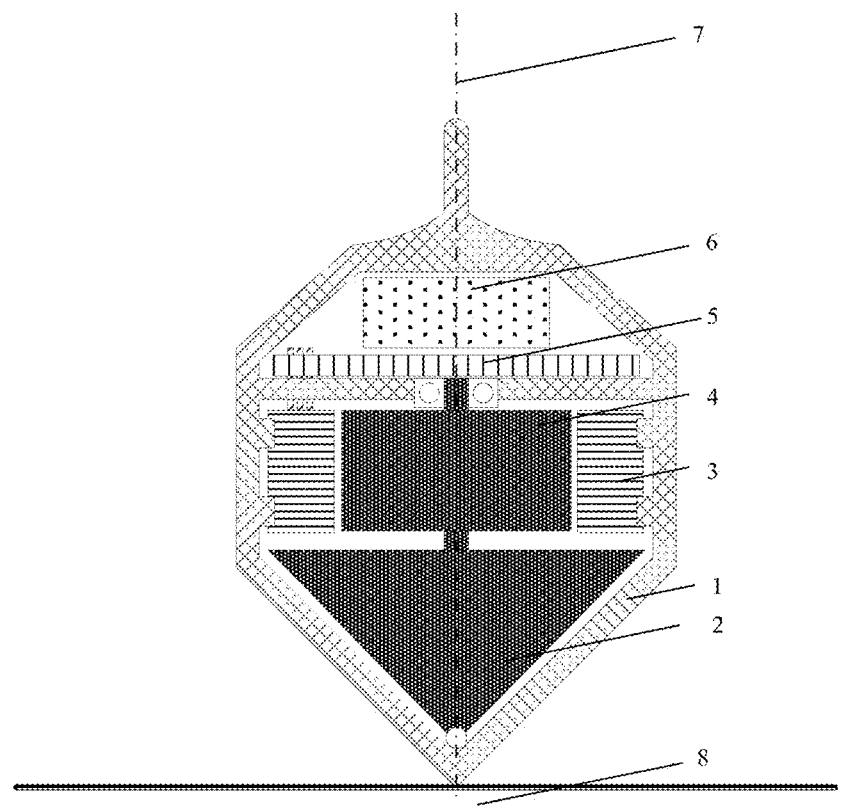
FIG. 1 is a sectional diagram of an instance which uses an inner rotor motor in the present disclosure.
Figure 2:
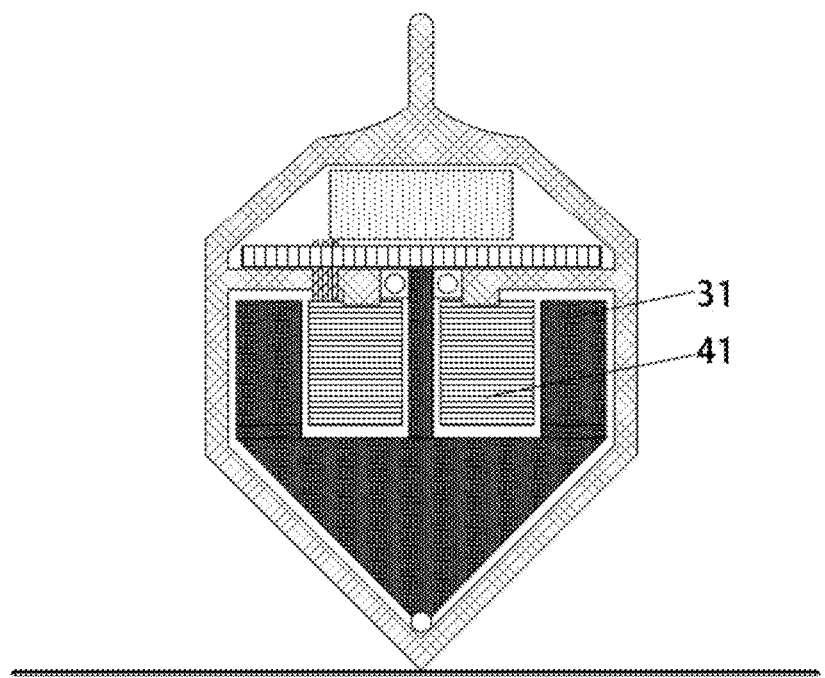
FIG. 2 is a sectional diagram of an instance which uses an outer rotor motor in the present disclosure.
Figure 3:
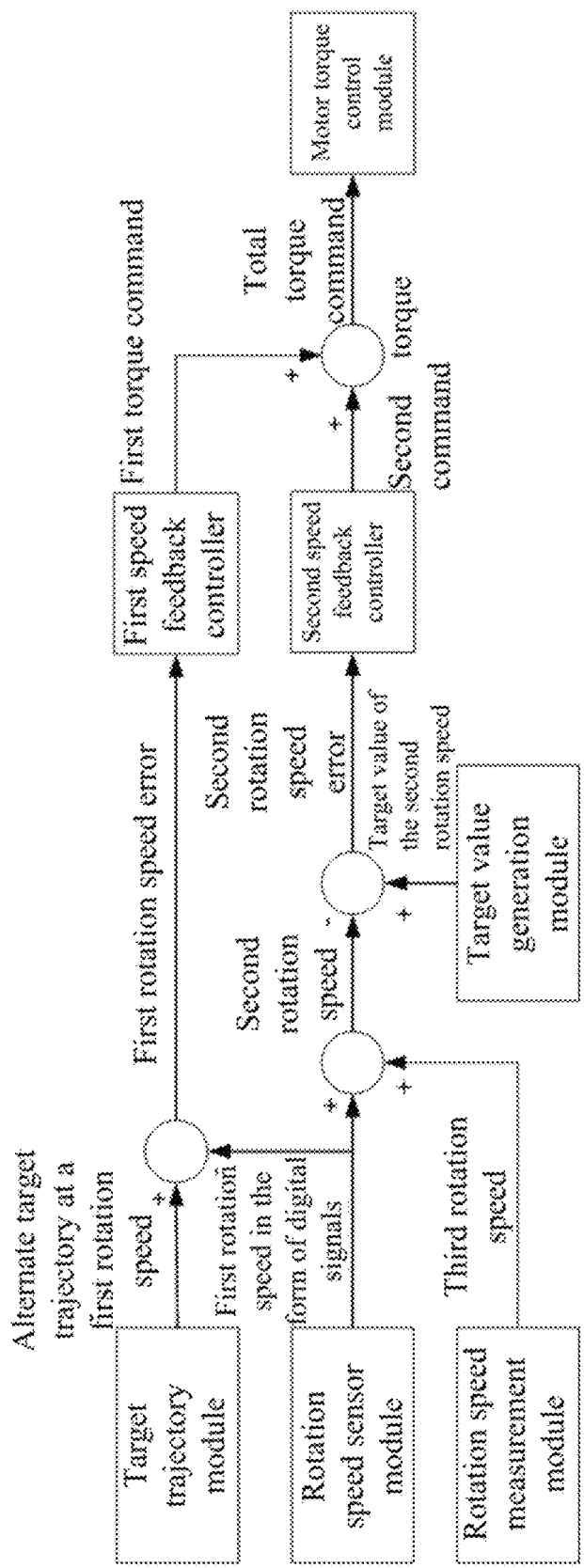
FIG. 3 is a control block diagram of a control system of the present disclosure.
Figure 4:
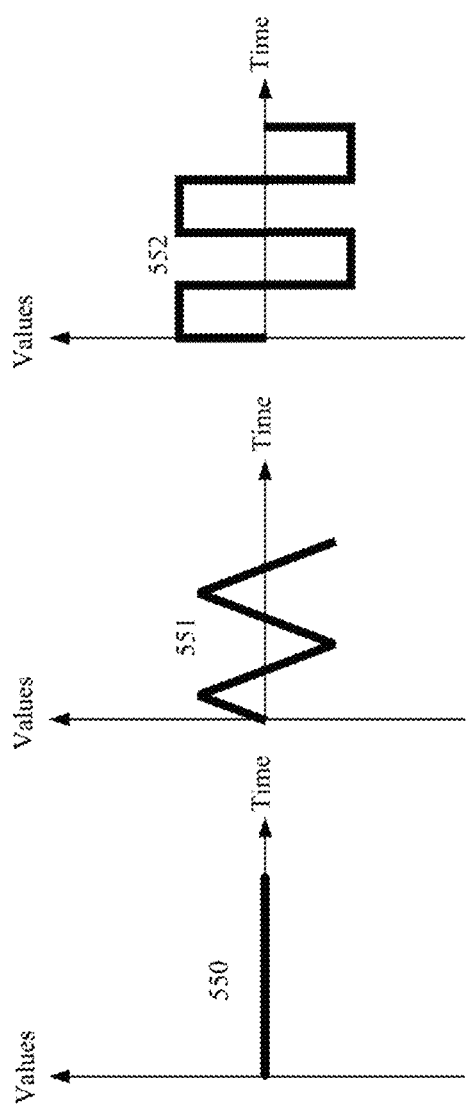
FIG. 4 shows three feasible styles of an alternate target trajectory at a first rotation speed in the present disclosure.

The technical solutions in the embodiments of the present disclosure are clearly and completely described below with reference to the accompanying drawings in the embodiments of the present disclosure. Apparently, the described embodiments are some rather than all of the embodiments of the present invention. Based on the described embodiments of the present disclosure, other embodiments acquired by those of ordinary skill in the art without creative effort all belong to the protection scope of the present disclosure.

In the description of the present disclosure, it should be noted that, the orientation or positional relationship indicated by the terms "opening", "upper", "lower", "thickness", "top", "middle", "length", "inner", "periphery", etc. are only used for the convenience of describing the present invention and simplifying the description, rather than indicating or implying that the denoted component or element must have a specific orientation or be constructed and operated in a specific orientation. Therefore, these terms cannot be understood as limitations to the present disclosure.

An electrically-driven gyroscope having a housing capable of alternate rotation is provided. As shown in the figure, such a device includes a rotating housing 1, an internal rotator 2, a drive motor composed of an electrical stator part 3 and a rotating part 4, a drive circuit 5, and a battery 6. The internal rotator 2 is mechanically connected to the rotating part 4 of the drive motor, and they can coaxially rotate about an axis 7 of symmetry with respect to the rotating housing 1. The electrical stator part 3 of the motor, the drive circuit 5, and the battery 6 are mutually electrically connected, and are all mechanically connected to the rotating housing 1. During one run when the gyroscope maintains an upright posture, the rotating housing 1 is supported by a pivot point on a support plane 8 stationary at the outside. The rotation speed of the rotating housing 1 about the axis 7 of symmetry with respect to the support plane 8 is denoted as a first rotation speed which may be constantly equal to zero or having an average value of zero, varying with time and both forward and reverse rotations occur. The rotation speed of the internal rotator 2 with respect to the stationary support plane 8 is denoted as a second rotation speed which is always greater than zero or less than zero. The rotation speed of the internal rotator 2 with respect to the rotating housing 1 is denoted as a third rotation speed which is always greater than zero or less than zero, and an absolute value of the third rotation speed is always greater than an absolute value of the first rotation speed. The foregoing rotation speeds are further characterized in that the first rotation speed plus the third rotation speed is equal to the second rotation speed.

The rotating part 4 and the electrical stator part 3 of the drive motor have many design forms, including an inner rotor motor, an outer rotor motor, an axial motor, and the like, one of which is selected for use.

In order to reduce the frictional resistance, a bearing may be additionally installed between the internal rotator 2 and the rotating housing 1, between the motor rotating part 4 and the rotating housing 1, and on the bottom of the rotating housing 1. In order to improve the stabilization of the gyroscope, it is suggested to use an internal rotator 2 with relatively high rotational inertia and a housing with relatively low rotational inertia.

The drive circuit includes: a rotation speed sensor which can measure the first rotation speed generally by means of an MEMS-based gyroscope or a common inertia measurement method; a motor drive circuit which can perform bidirectional voltage, current and energy interaction with the motor, and may be a circuit in the form of an H bridge or a three-phase inverter bridge; and a control system which can implement alternate rotation of the housing and achieve the requirement for the relationship between the first, second, and third rotation speeds. The control system may exist in the form of an analog circuit. For example, an analog feedback controller composed of an LM124 operational amplifier is used; or the control system exists in the form of a digital control algorithm in a control chip, for example, C language programming in the control chip microcontroller STM32F407. The control system has the following specific characteristics:

The first rotation speed in the form of digital signals is measured by using the rotation speed sensor module in the drive circuit 5. The third rotation speed in the form of digital signals is obtained by means of a motor speed sensor or a motor speed measurement module using a universal motor speed estimation method. The second rotation speed is obtained by the first rotation speed plus the third rotation speed. An alternate target trajectory at the first rotation speed is generated by using a target trajectory module. The target trajectory minus the first rotation speed makes a first rotation speed error, and a first torque command is generated after the error is delivered to a first speed feedback controller. A target value of the second rotation speed is generated by using a target value generation module. The target value minus the second rotation speed makes a second rotation speed error, and a second torque command is generated after the error is delivered to a second speed feedback controller. This command plus the first torque command makes a total torque command, which is then delivered to a universal motor torque control module.

Due to cost, volume, and other factors, when the motor speed sensor is not used, it is required to use the motor speed estimation method, such as a universal estimation method without a position sensor or an open-loop estimation method, to implement the functions of the motor speed measurement module.

The first speed feedback controller and the second speed feedback controller may be a universal feedback controller, for example, a feedback controller of a proportional-integral type.

The motor torque control module may resort to a frequently-used universal motor torque control method, for example, closed-loop current control, direct torque control, or the like.

The alternate target trajectory at the first rotation speed that is generated by the target trajectory module is a trajectory with an average value of zero. Such a trajectory may be constantly equal to zero; or may be in the shape of a symmetric triangular wave, a symmetric square wave, or other symmetric or asymmetrical trajectories with an average value of zero.

The target value of the second rotation speed that is generated by the target value generation module is constantly positive or negative during one run when the gyroscope maintains an upright posture, and its absolute value is always greater than a boundary value. This boundary value is the minimum rotation speed which can keep the whole gyroscope stable and upright and is determined according to the design of the gyroscope. After design completion of the gyroscope, the boundary value is a constant value. From the perspective of engineering margin, the absolute value of the target value of the second rotation speed is suggested to be more than 1.2 times of the boundary value.

In the description of the present specification, the reference terms "one embodiment", "example", "specific example" and the like mean that specific characteristics, structures, materials or features described with reference to the embodiment or example are included in at least one embodiment or example of the present specification. In the present specification, the schematic description of the above terms does not have to be directed to the same embodiment or example. Furthermore, the described specific characteristics, structures, materials, or features may be combined in a suitable manner in any one or more embodiments or examples.

The above shows and describes the basic principles, main features, and advantages of the present disclosure. Those skilled in the art should understand that the present disclosure is not limited by the foregoing embodiment, and the foregoing description in the embodiment and the specification is merely for explaining the principle of the present disclosure. Various changes and improvements may be made to the present disclosure without departing from the spirit and scope of the present disclosure, and these changes and improvements all fall within the protection scope of the present disclosure.

What is claimed is:

1. An electrically-driven gyroscope having a housing capable of alternate rotation, comprising: a rotating housing (1), an internal rotator (2), a drive motor composed of an electrical stator part (3) and a rotating part (4), a drive circuit (5), and a battery (6),
wherein the rotating housing (1) is controlled to make positive and negative alternate rotations at an average speed of zero;
the internal rotator (2) is mechanically connected to the rotating part (4) of the drive motor, and the internal rotator (2) and the rotating part (4) rotate with respect to the rotating housing (1) always in one direction;
the electrical stator part (3) of the motor, the drive circuit (5), and the battery (6) are mutually electrically connected, and are all connected inside the rotating housing (1); and
the drive circuit (5) comprises: a rotation speed sensor used for measuring a rotation speed of the rotating housing (1) with respect to an inertial frame of reference; a motor drive circuit used for performing bidirectional voltage, current and energy interaction with the drive motor; and a control module used for realizing the alternate rotation characteristic of the housing and the rotation characteristic of the internal rotator.

2. The electrically-driven gyroscope having a housing capable of alternate rotation according to claim 1, wherein the electrical stator part (3) and the rotating part (4) of the drive motor are driven by the drive circuit (5); and the drive motor adopted is one of an inner rotor motor, an outer rotor motor, and an axial motor.

3. The electrically-driven gyroscope having a housing capable of alternate rotation according to claim 1, wherein alternate rotation of the housing follows a target trajectory; wherein the target trajectory is a trajectory with an average value of zero; and the trajectory is constantly equal to zero, or in the shape of a symmetric triangular wave, a symmetric square wave, or other symmetric or asymmetrical trajectories with an average value of zero.

4. The electrically-driven gyroscope having a housing capable of alternate rotation according to claim 1, wherein a target value of the rotation speed of the internal rotator (2) with respect to the rotating housing (1) is constantly positive or negative during operation when the gyroscope maintains an upright posture, and an absolute value of the target value is always greater than a boundary value, the boundary value is the minimum rotation speed which can keep the whole gyroscope upright.

* * * * *